US012646219B2

(12) United States Patent　　　(10) Patent No.:　US 12,646,219 B2
Hong et al.　　　　　　　　　　　(45) Date of Patent:　　　Jun. 2, 2026

(54) HOLOGRAM GENERATION AND STREAMING METHOD AND SYSTEM USING MULTI-COMPUTERS

(71) Applicant: Korea Electronics Technology Institute, Seongnam-si (KR)

(72) Inventors: Sung Hee Hong, Seoul (KR); Young Min Kim, Seoul (KR); Ji Soo Hong, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 128 days.

(21) Appl. No.: 18/713,730

(22) PCT Filed: Dec. 6, 2021

(86) PCT No.: PCT/KR2021/018317
　　§ 371 (c)(1),
　　(2) Date: May 28, 2024

(87) PCT Pub. No.: WO2023/106429
　　PCT Pub. Date: Jun. 15, 2023

(65) Prior Publication Data
　　US 2025/0029282 A1　　Jan. 23, 2025

(30) Foreign Application Priority Data
　　Dec. 6, 2021　(KR) ........................ 10-2021-0172556

(51) Int. Cl.
　　*G06T 15/00*　　(2011.01)
　　*G06T 9/00*　　(2006.01)
(52) U.S. Cl.
　　CPC .............. *G06T 9/00* (2013.01); *G06T 15/005* (2013.01)

(58) Field of Classification Search
　　None
　　See application file for complete search history.

(56) References Cited

U.S. PATENT DOCUMENTS

2018/0143588 A1* 5/2018 Lee ...................... G03H 1/2294
2019/0073831 A1* 3/2019 Kim ........................ G06F 3/011

FOREIGN PATENT DOCUMENTS

KR　10-2017-0021450 A　2/2017
KR　10-2018-0008168 A　1/2018
KR　10-2020-0119716 A　10/2020

OTHER PUBLICATIONS

Yoo et al., "High-Performance Computer-Generated Hologram by Optimized implementation of Parallel GPGPUs", 2014. (Year: 2014).*

(Continued)

*Primary Examiner* — Nicholas R Wilson
(74) *Attorney, Agent, or Firm* — NSIP Law

(57) ABSTRACT

A hologram generation and streaming method and system using multi-PCs are provided. A hologram streaming service system according to an embodiment of the present invention comprises: a hologram generation server for generating a hologram streaming image by using multiple computers; and a hologram player for playing the hologram streaming image generated in the hologram generating server. Therefore, distributed processing of the multi-PCs is used to generate a hologram at high speed so that a service can be streamed without delay in real time even for a high-resolution hologram.

10 Claims, 5 Drawing Sheets

(56) References Cited

OTHER PUBLICATIONS

Seo et al., "Scalable Hologram Video Coding for Adaptive Transmitting Service", 2012. (Year: 2012).*

International Search Report issued on Aug. 22, 2022 for corresponding PCT/KR2021/018317 (3 pages in Korean).

Preliminary Reason of Rejection issued on Jun. 20, 2023 for corresponding Korean Patent Application No. 10-2021-0172556 (3 pages in English, 5 pages in Korean).

Takada, Naoki, et al. "Fast high-resolution computer-generated hologram computation using multiple graphics processing unit cluster system." *Applied optics* 51.30 (Oct. 16, 2012): pp. 7303-7307.

* cited by examiner

HOLOGRAM GENERATION AND STREAMING METHOD AND SYSTEM USING MULTI-COMPUTERS

CROSS REFERENCE TO RELATED APPLICATIONS

This application is a U.S. National Stage Application of International Application No. PCT/KR2021/018317, filed on Dec. 6, 2021, which claims the benefit under 35 USC 119 (a) and 365 (b) of Korean Patent Application No. 10-2021-0172556, filed on Dec. 6, 2021, in the Korean Intellectual Property Office.

TECHNICAL FIELD

The disclosure relates to a hologram streaming method, and more particularly, to a method for generating a hologram streaming image in real time and providing a streaming service.

BACKGROUND ART

Rendering a computer-generated hologram (CGH) by using a point cloud is technically possible, but has a problem. FIG. 1 is a view illustrating a problem of a related-art hologram generation method.

As shown in the drawing, in a CGH using a point cloud, the number of points constituting an object increases as the hologram has a higher resolution, and the amount of computation also increases exponentially, and thus, it may be difficult to stream a hologram in real time.

Accordingly, there is a demand for a solution for generating a hologram in real time and streaming.

DISCLOSURE

Technical Problem

The disclosure has been developed in order to address the above-discussed deficiencies of the prior art, and an object of the disclosure is to provide a method for generating a hologram at high speed by using multi-PCs and multi-graphic processing unit (GPU) distributed processing, and providing a streaming service, as a solution to generate/ stream a hologram of a high resolution in real time and to reproduce the same.

Technical Solution

According to an embodiment of the disclosure to achieve the above-described object, a hologram streaming service system may include: a hologram generation server configured to generate a hologram streaming image by using a plurality of computers; and a hologram reproduction device configured to reproduce the hologram streaming image generated at the hologram generation server.

Each computer may generate only a holographic fringe pattern assigned thereto among holographic fringe patterns on hologram images constituting the hologram streaming image.

The hologram generation server may arrange holographic fringe patterns generated at the respective computers in sequence and may compress and stream the holographic fringe patterns.

Each computer may divide points constituting a point cloud which is used for generating the holographic fringe pattern assigned thereto, may perform distributed processing through a plurality of GPUs, and may combine the processed holographic fringe patterns.

Each computer may encode and normalize the generated holographic fringe patterns based on information on a display size of the hologram reproduction device and a wavelength of a light source.

According to an embodiment of the disclosure, the hologram streaming service system may further include a mobile terminal configured to receive setting of the information on the display size of the hologram reproduction device and the wavelength of the light source, and to transmit the information to the hologram generation server.

The mobile terminal may receive the hologram streaming image generated at the hologram generation server, and may transmit the hologram streaming image to the hologram reproduction device.

According to another embodiment of the disclosure, a hologram streaming service method may include: a step of generating, by a hologram generation server, a hologram streaming image by using a plurality of computers; and a step of reproducing, by a hologram reproduction device, the hologram streaming image generated at the generation step.

Advantageous Effects

As described above, according to embodiments of the disclosure, multiple PCs and multi-GPU distributed processing may be used to generate a hologram at high speed, so that a streaming service may be provided without delay in real time even for a high-resolution hologram.

According to embodiments of the disclosure, a generated hologram may be compressed and transmitted, so that a user may replay streaming of a high-quality hologram image only with network communication using a mobile terminal.

BEST MODE

Hereinafter, the disclosure will be described in more detail with reference to the drawings.

Embodiments of the disclosure provide a hologram generation and streaming method using multiple PCs. Compared to a related-art method of generating a hologram in one PC, a method in embodiments of the disclosure may generate a hologram streaming image in real time through distributed processing in a multi-PC environment.

Figure 1:
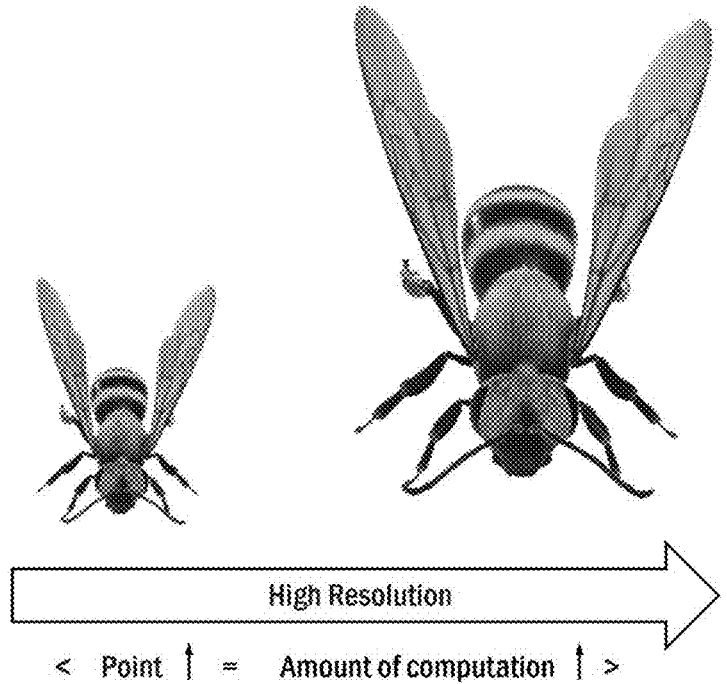
FIG. 1 is a view illustrating a problem of a related-art hologram generation method.
Figure 2:
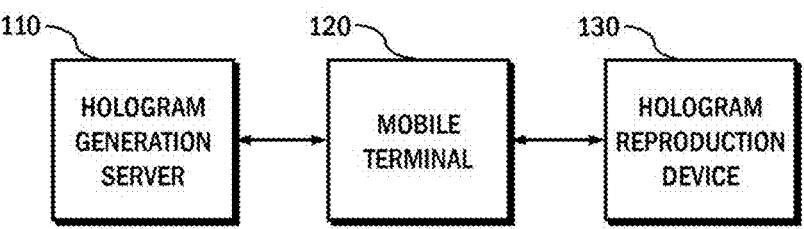
FIG. 2 is a view illustrating a configuration of a hologram streaming service system according to an embodiment of the disclosure.

FIG. 2 is a view illustrating a configuration of a hologram streaming service system according to an embodiment of the disclosure. The hologram streaming service system according to an embodiment of the disclosure may include a hologram generation server 110, a mobile terminal 120, and a hologram reproduction device 130 as shown in the drawing.

The hologram generation server 110 is a server of a service provider that generates a hologram streaming image in real time by using a plurality of PCs and transmits the hologram streaming image.

The mobile terminal 120 may access the hologram generation server 110 through a transmission control protocol/Internet protocol (TCP/IP) network, and may receive a hologram streaming image generated in real time and may transmit the hologram streaming image to the hologram reproduction device 130.

The hologram reproduction device 130 is a device that reproduces a hologram streaming image received from the hologram generation server 110 through the mobile terminal 120. The hologram reproduction device 130 may be implemented by a spatial light modulator (SLM) or a holographic head mounted display (HMD).

Figure 3:
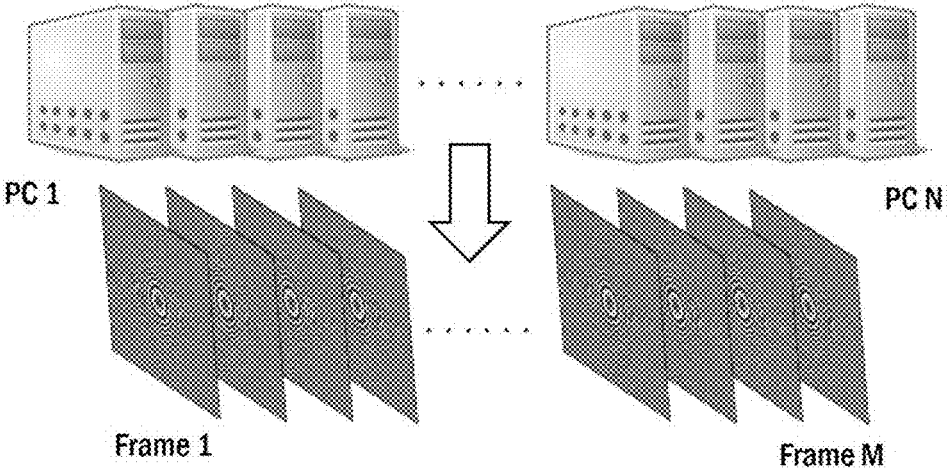
FIG. 3 is a view provided to explain a method for generating a hologram streaming image by a hologram generation server.

FIG. 3 is a view provided to explain a method of generating a hologram streaming image by the hologram generation server 110.

As shown in the drawing, the hologram generation server 110 may include a plurality of PCs, and the PCs may generate holographic fringe patterns which are required to reproduce hologram images constituting a hologram streaming image.

In this case, each PC generates only a holographic fringe pattern assigned thereto. That is, PC 1 may generate holographic fringe pattern 1, and PC 2 may generate holographic fringe pattern 2.

However, one PC does not necessarily generate one holographic fringe pattern. As shown in the drawing, N PCs may generate M holographic fringe patterns, and the number of holographic fringe patterns generated by the PCs may vary according to resources or performance of the PCs.

The hologram generation server 110 may arrange the holographic fringe patterns generated by the PCs in sequence, and then, may compress and stream the holographic fringe patterns, thereby providing a service in the form of a video hologram.

Figure 4:
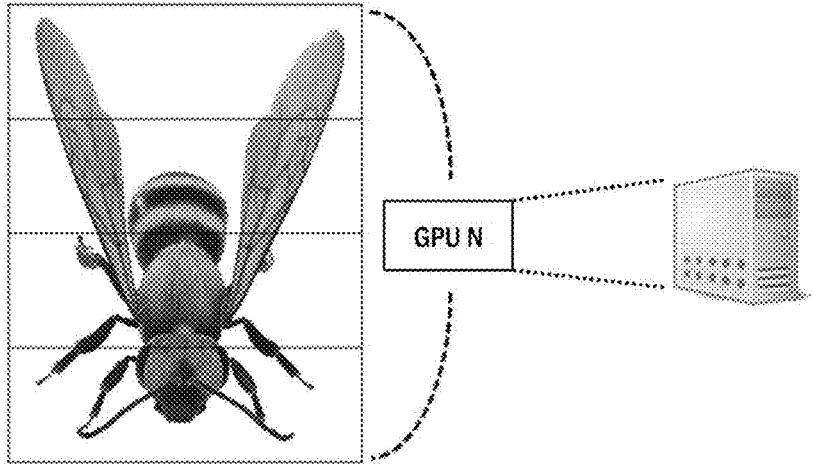
FIG. 4 is a view provided to explain a method for generating holographic fringe patterns assigned to respective PCs of the hologram generation server.

FIG. 4 is a view provided to explain a method of generating holographic fringe patterns assigned to respective PCs of the hologram generation server 110.

As shown in the drawing, each PC constituting the hologram generation server 110 may divide points constituting a point cloud to use in generating a holographic fringe pattern assigned thereto, and may perform distributed processing through a plurality of GPUs and then may combine the processed holographic fringe patterns.

FIG. 4 illustrates that the number of GPUs included in a PC is 4 and a point cloud is divided into 4 parts and processed, thereby generating holographic fringe patterns.

In generating holographic fringe patterns, the PCs may encode and normalize the generated holographic fringe patterns based on information on a display size of the hologram reproduction device and a wavelength of a light source.

To encode, the hologram generation server 110 may receive information on the display size of the hologram reproduction device 130 and the wavelength of the light source from the mobile terminal 120.

Figure 5:
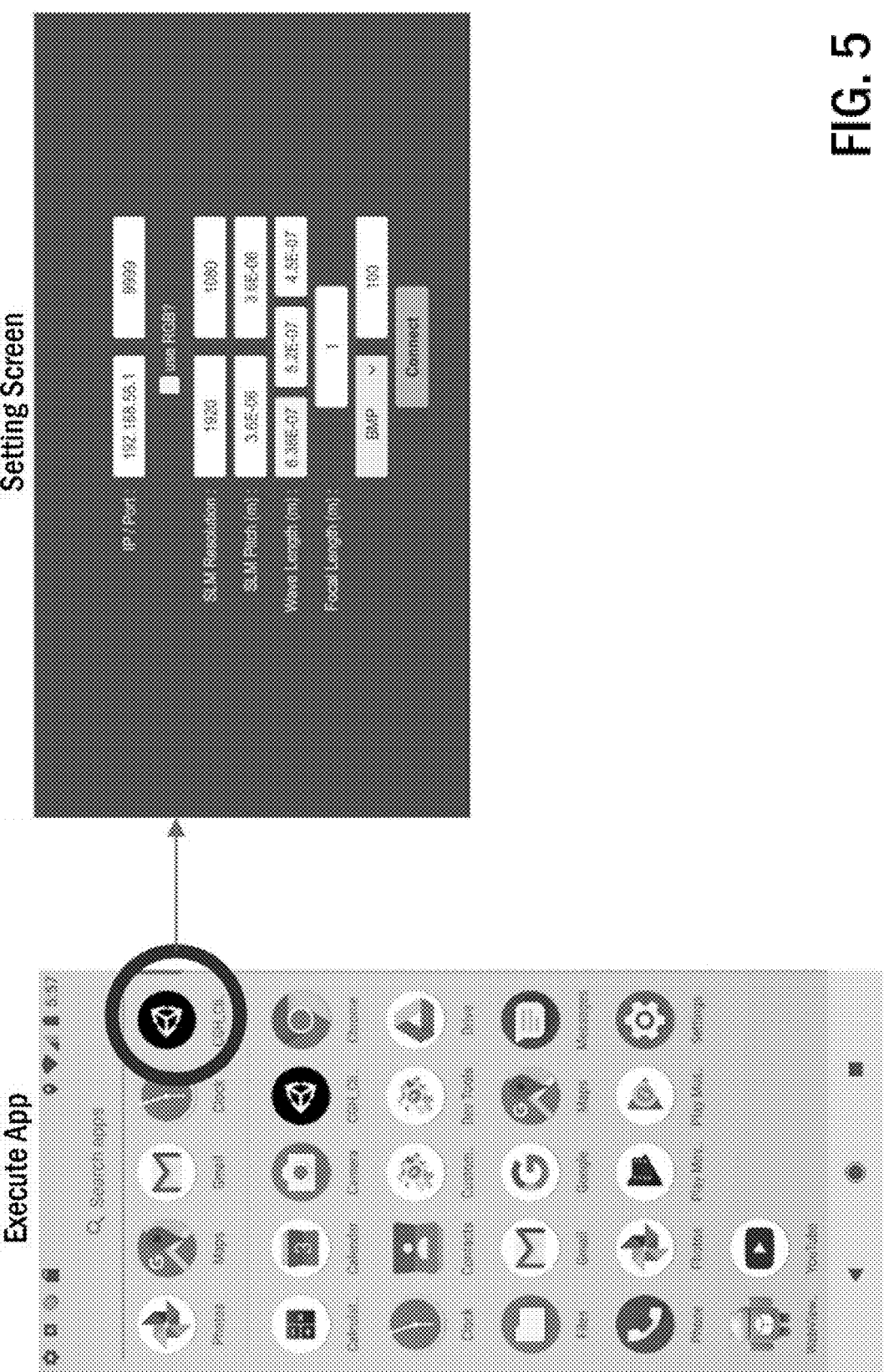
FIG. 5 is a view illustrating a process of setting information by using a hologram streaming application installed in a mobile terminal.

FIG. 5 illustrates a process of setting the above-described information by executing a hologram streaming application installed in the mobile terminal 120.

Figure 6:
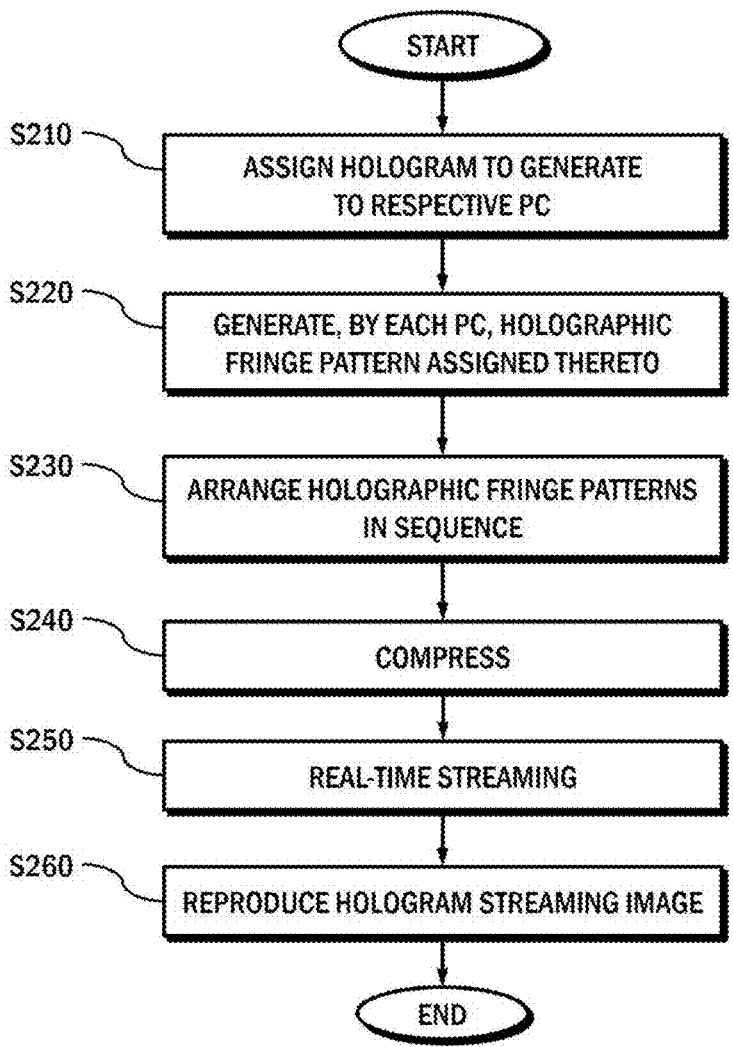
FIG. 6 is a flowchart provided to explain a real-time hologram streaming service method according to another embodiment of the disclosure.

FIG. 6 is a flowchart provided to explain a real-time hologram streaming service method according to another embodiment of the disclosure.

To perform real-time hologram streaming, the hologram generation server 110 assigns a hologram to generate to respective PCs (S210). Accordingly, PCs constituting the hologram generation server 110 may generate holographic fringe patterns assigned thereto (S220).

At step S220, each PC may divide points constituting a point cloud by the number of GPUs and may generate a holographic fringe pattern by performing distributed processing through respective GPUs, and then, may encode and normalize the generated holographic fringe pattern according to a display size of the hologram reproduction device 130 and a wavelength of a light source.

The PCs may generate the same number of holographic fringe patterns or may generate different numbers of holographic fringe patterns according to their respective resources and performance.

The hologram generation server 110 may arrange the holographic fringe patterns generated at step S220 in sequence (S230), may compress the holographic fringe patterns according to a video compression technique (S240), and may stream the video to the hologram reproduction device 130 through the mobile terminal 120 in real time (S250).

The hologram reproduction device 130 may reproduce a hologram streaming image of a high resolution received through step S250 (S260), so that a user may enjoy the image in real time.

Up to now, a hologram generation and streaming method and system using multiple PCs has been described with reference to preferred embodiments.

In the above-described embodiments, multiple PCs and multi-GPU distributed processing are used to generate a hologram of a high resolution at high speed and stream the hologram in real time.

When a hologram is generated and streamed by using multiple PCs, a streaming service may be provided without delay even for a high-resolution hologram, and a normal user may enjoy streaming of a high-quality hologram image only with network communication using a mobile terminal.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

The invention claimed is:

1. A hologram streaming service system comprising:
a hologram generation server configured to generate a hologram streaming image by using a plurality of computers; and
a hologram reproduction device comprising a projector or a head-mounted display (HMD) and configured to reproduce the hologram streaming image generated at the hologram generation server,
wherein each of the plurality of computers is configured to generate only a holographic fringe pattern assigned thereto among holographic fringe patterns on hologram images constituting the hologram streaming image, and
wherein the hologram generation server is configured to arrange holographic fringe patterns generated at the respective computers in sequence and compresses and streams the holographic fringe patterns to the hologram reproduction device.

2. The hologram streaming service system of claim 1, wherein each computer is configured to divide points constituting a point cloud which is used for generating the holographic fringe pattern assigned thereto, to perform distributed processing through a plurality of GPUs, and to combine the processed holographic fringe patterns.

3. The hologram streaming service system of claim 1, wherein each computer is configured to encode and normalize the generated holographic fringe patterns based on information on a display size of the hologram reproduction device and a wavelength of a light source.

4. The hologram streaming service system of claim 3, further comprising a mobile terminal configured to receive setting of the information on the display size of the hologram reproduction device and the wavelength of the light source, and to transmit the information to the hologram generation server.

5. The hologram streaming service system of claim 3, further comprising a mobile terminal is configured to receive the hologram streaming image generated at the hologram generation server, and to transmit the hologram streaming image to the hologram reproduction device.

6. A processor-implemented hologram streaming service method comprising:
generating, by a hologram generation server, a hologram streaming image by using a plurality of computers; and
reproducing, by a hologram reproduction device comprising a projector or a head-mounted display (HMD), the hologram streaming image generated by the hologram generation server,
wherein the generating comprises:
generating, by each of the plurality of computers, only a holographic fringe pattern assigned thereto among holographic fringe patterns on hologram images constituting the hologram streaming image; and
arranging, by the hologram generation server, holographic fringe patterns generated at the respective computers in sequence, compressing the arranged holographic fringe patterns, and streaming the compressed holographic fringe patterns to the hologram reproduction device.

7. The hologram streaming service method of claim 6, comprising dividing, by each computer, points constituting a point cloud which is used for generating the holographic fringe pattern assigned thereto, performing, by each computer, distributed processing through a plurality of GPUs, and combining, by each computer, the processed holographic fringe patterns.

8. The hologram streaming service method of claim 6, further comprising encoding and normalizing, by each computer, the generated holographic fringe patterns based on information on a display size of the hologram reproduction device and a wavelength of a light source.

9. The hologram streaming service method of claim 8, further comprising receiving, by a mobile terminal, setting of the information on the display size of the hologram reproduction device and the wavelength of the light source, and transmitting, by the mobile terminal, the information to the hologram generation server.

10. The hologram streaming service method of claim 8, further comprising receiving, by a mobile terminal, the hologram streaming image generated at the hologram generation server, and transmitting, by the mobile terminal, the hologram streaming image to the hologram reproduction device.

* * * * *